United States Patent
Seo et al.

(10) Patent No.: US 11,264,668 B2
(45) Date of Patent: Mar. 1, 2022

(54) BATTERY MODULE HAVING IMPROVED COOLING STRUCTURE

(71) Applicant: LG Energy Solution, Ltd., Seoul (KR)

(72) Inventors: Sung-Won Seo, Daejeon (KR); Dal-Mo Kang, Daejeon (KR); Jeong-O Mun, Daejeon (KR); Yoon-Koo Lee, Daejeon (KR)

(73) Assignee: LG Energy Solution, Ltd.

( * ) Notice: Subject to any disclaimer, the term of this patent is extended or adjusted under 35 U.S.C. 154(b) by 69 days.

(21) Appl. No.: 16/618,534

(22) PCT Filed: Dec. 5, 2018

(86) PCT No.: PCT/KR2018/015340
§ 371 (c)(1),
(2) Date: Dec. 2, 2019

(87) PCT Pub. No.: WO2019/132290
PCT Pub. Date: Jul. 4, 2019

(65) Prior Publication Data
US 2020/0168864 A1    May 28, 2020

(30) Foreign Application Priority Data
Dec. 27, 2017 (KR) .......................... 10-2017-0180560

(51) Int. Cl.
*H01M 10/625* (2014.01)
*H01M 50/20* (2021.01)
*H01M 10/656* (2014.01)

(52) U.S. Cl.
CPC ......... *H01M 50/20* (2021.01); *H01M 10/625* (2015.04); *H01M 10/656* (2015.04)

(58) Field of Classification Search
CPC ............. H01M 10/613; H01M 10/625; H01M 10/647; H01M 10/6556; H01M 10/656;
(Continued)

(56) References Cited

U.S. PATENT DOCUMENTS

2006/0214641 A1    9/2006  Cho
2011/0052959 A1*   3/2011  Koetting ........... H01M 10/6567
                                                         429/120
(Continued)

FOREIGN PATENT DOCUMENTS

DE    102015214185 A1    2/2017
EP       2442383 A1      4/2012
(Continued)

OTHER PUBLICATIONS

International Search Report for Application No. PCT/KR2018/015340 dated Mar. 20, 2019, 2 pages.
(Continued)

*Primary Examiner* — Victoria H Lynch
(74) *Attorney, Agent, or Firm* — Lerner, David, Littenberg, Krumholz & Mentlik, LLP

(57) ABSTRACT

A battery module includes a cell stack defined by a stack of a plurality of battery cells; and a module housing configured to accommodate the cell stack. The module housing has a lower housing, a pair of side housings, a pair of front and rear housings, and an upper housing. The lower housing may include a base plate configured to cover a lower surface of the cell stack; a spacer interposed between the cell stack and the base plate to partially cover the lower surface of the cell stack; a supply tube connected to the spacer to supply a cooling medium through the inside of the spacer to an empty space defined between the cell stack and the base plate; and a discharge tube connected to the spacer to discharge the cooling medium from the empty space and the spacer.

11 Claims, 7 Drawing Sheets

(58) Field of Classification Search
CPC ......... H01M 10/6567; H01M 2220/20; H01M 50/20; Y02E 60/10
See application file for complete search history.

(56) References Cited

U.S. PATENT DOCUMENTS

| | | |
|---|---|---|
| 2014/0370340 A1 | 12/2014 | Kimura et al. |
| 2015/0229010 A1 | 8/2015 | Ahn |
| 2016/0233465 A1 | 8/2016 | Lee et al. |
| 2017/0200991 A1 | 7/2017 | Nam et al. |
| 2018/0151929 A1 | 5/2018 | Song et al. |

FOREIGN PATENT DOCUMENTS

| | | |
|---|---|---|
| JP | 2013051100 A | 3/2013 |
| JP | 2014093244 A | 5/2014 |
| JP | 2014220089 A | 11/2014 |
| JP | 2016095960 A | 5/2016 |
| KR | 20060102851 A | 9/2006 |
| KR | 20150081514 A | 7/2015 |
| KR | 20150094030 A | 8/2015 |
| KR | 101561121 B1 | 10/2015 |
| KR | 20160016517 A | 2/2016 |
| KR | 20170041569 A | 4/2017 |
| KR | 101780037 B1 | 9/2017 |
| WO | 2017015826 A1 | 2/2017 |

OTHER PUBLICATIONS

International Search Report for Application No. EP 18897735, dated Oct. 8, 2020, 6 pages.

\* cited by examiner

BATTERY MODULE HAVING IMPROVED COOLING STRUCTURE

CROSS-REFERENCE TO RELATED APPLICATIONS

This application is a national phase entry under 35 U.S.C. § 371 of International Application No. PCT/KR2018/015340 filed Dec. 5, 2018, which claims priority from Korean Patent Application No. 10-2017-0180560 filed on Dec. 27, 2017, the disclosures of which are incorporated herein by reference.

TECHNICAL FIELD

The present disclosure relates to a battery module with an improved cooling structure, and more particularly, to a battery module with an improved cooling efficiency, which uses an insulating oil for cooling and has a cooling structure for allowing the insulating oil to directly contact battery cells.

BACKGROUND ART

Secondary batteries commercially used at present include nickel-cadmium batteries, nickel-hydrogen batteries, nickel-zinc batteries, and lithium secondary batteries. Among them, the lithium secondary batteries are highly significant due to substantially no memory effect to ensure free charging and discharging, very low self-discharge rate and high energy density, compared to nickel-based secondary batteries.

The lithium secondary battery mainly uses a lithium-based oxide and a carbonaceous material as a positive electrode active material and a negative electrode active material, respectively. The lithium secondary battery includes an electrode assembly in which a positive electrode plate and a negative electrode plate, coated with a positive electrode active material and a negative electrode active material, respectively, are disposed with a separator being interposed therebetween, and an exterior, namely a battery case, for hermetically accommodating the electrode assembly along with an electrolyte.

Generally, the lithium secondary battery may be classified into a can-type secondary battery (in which the electrode assembly is included in a metal can) and a pouch-type secondary battery (in which the electrode assembly is included in a pouch made of aluminum laminate sheets), depending on the shape of the exterior.

Recently, secondary batteries have been widely used not only in small-sized devices such as portable electronic devices but also in medium-sized or large-sized devices such as vehicles and power storage systems. When used in the medium-sized or large-sized devices, a large number of secondary batteries are electrically connected to increase capacity and power. In particular, pouch-type cells are widely used for the medium-sized or large-sized devices because they may be easily stacked.

However, the pouch-type cell is generally packaged in a battery case made of a laminate sheet of aluminum and polymer resin, and thus its mechanical stiffness is not large. Thus, when the battery module including a plurality of pouch-type cells is configured, a frame is often used to protect the secondary batteries from external impact, prevent shaking thereof, and facilitate stacking thereof.

The frame may be known by different names, such as a cartridge. In many cases, the frame has a rectangular shape having an empty center portion, and four sides of the frame surround the outer circumference of the pouch-type cell. In addition, a plurality of frames are stacked to assemble the battery module, and the pouch-type cells may be placed in the empty space inside the frame when the frames are stacked.

Meanwhile, referring to FIG. 1, a conventional battery module structure is shown. If a plurality of pouch-type cells 1 are stacked by using a plurality of frames 2, in the conventional battery module structure, plate-shaped cooling fins 3 are applied on the outer surfaces of each of the pair of pouch-type cells 1, thereby increasing the cooling efficiency.

The secondary battery may be used in high temperature environments such as summer, and the secondary battery may also generate heat itself. Thus, if a plurality of secondary batteries are stacked on each other, the temperature of the secondary batteries may become higher. If the temperature is higher than a proper temperature, the performance of the secondary batteries may deteriorate, and in severe cases, explosion or ignition may occur. Thus, when the battery module is configured, the cooling fins 3 are applied to contact the surface of the pouch-type cell 1, and the cooling fins 3 are brought into contact with a cooling plate 4 located therebelow to prevent the overall temperature of the battery module from rising. This configuration is used frequently.

However, if the cooling fin 3 (usually made of a metal material) is interposed between the pouch-type cells 1 facing each other to assemble the battery module, the contact heat resistance is inevitably very large due to the difference in material between the cooling fin 3 and the surface of the pouch-type cell 1. Also, only with the cooling method that depends on the conductivity of the metal, sufficient cooling is achieved in a situation where a large amount of heat is generated.

Thus, there is an urgent need to develop a battery module structure using a cooling method capable of reducing contact thermal resistance and allowing heat to be emitted more efficiently, compared to a simple thermal conduction method.

DISCLOSURE

Technical Problem

The present disclosure is designed to solve the problems of the related art, and therefore the present disclosure is directed to providing a battery module, including a cooling structure capable of allowing direct contact between a cooling medium and battery cells so that the battery module may be efficiently cooled even when the amount of heat increases (by applying a battery module with a high capacity and/or a high output).

However, the technical problem to be solved by the present disclosure is not limited to the above, and other objects not mentioned herein will be understood from the following description by those skilled in the art.

Technical Solution

In one aspect of the present disclosure, there is provided a battery module, comprising: a cell stack formed by stacking a plurality of battery cells; and a module housing configured to accommodate the cell stack and having a lower housing, a pair of side housings, a pair of front and rear housings, and an upper housing for respectively covering a lower portion, both side portions, front and rear portions, and an upper portion of the cell stack. The lower housing may include: a base plate configured to entirely cover a lower surface of the cell stack; a spacer interposed between the cell stack and the base plate to partially cover the lower surface of the cell stack so that an empty space is formed between the cell stack and the base plate; a supply tube connected to the spacer to supply a cooling medium to the empty space through the inside of the spacer; and a discharge tube connected to the spacer to discharge the cooling medium flowing in the empty space and the spacer to the outside.

An adhesive may be interposed between the cell stack and the spacer so that the cooling medium does not leak between the cell stack and the spacer.

Coupling units having respective coupling grooves may be provided at both sides of the base plate; a coupling protrusion protruding downward may be formed at a lower end of each side housing, and the coupling protrusions may be inserted and fixed into the respective coupling grooves to fix the side housings to the base plate.

Each coupling unit may have a protrusion protruding toward an inner side of the battery module, and the protrusion may extend to contact a battery cell located at an outermost side of the cell stack to prevent the cooling medium from leaking between the base plate and the cell stack.

The spacer may include a first spacer provided at one end of the base plate in a longitudinal direction; a second spacer provided at the other end of the base plate in the longitudinal direction; and a third spacer spaced apart from the first spacer and the second spacer and provided between the first spacer and the second spacer.

The supply tube may be connected to a first spacer channel formed through the inside of the first spacer, and the discharge tube may be connected to a second spacer channel formed through the inside of the second spacer.

The third spacer may have a third spacer channel formed through the inside thereof so that the cooling medium supplied through the first spacer flows toward the second spacer.

Meanwhile, in another aspect of the present disclosure, there is also provided a battery pack, which is implemented by connecting a plurality of battery modules according to an embodiment of the present disclosure. Also, in another aspect of the present disclosure, there is also provided a vehicle, comprising the battery pack according to an embodiment of the present disclosure.

Advantageous Effects

According to an embodiment of the present disclosure, since a battery module with a cooling structure capable of direct contact between a cooling medium and battery cells is provided, the battery module may be efficiently cooled even when the amount of heat increases by utilizing a battery module with a high capacity and/or a high output, thereby improving the performance of the battery module. Moreover, it is possible to prevent safety accidents such as ignition and explosion of the battery cells due to temperature rise.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustration only, not intended to limit the scope of the disclosure, so it should be understood that other equivalents and modifications could be made thereto without departing from the scope of the disclosure.

First, components of a battery module 10 according to an embodiment of the present disclosure will be described briefly with reference to FIGS. 2 and 3.

Figure 1:
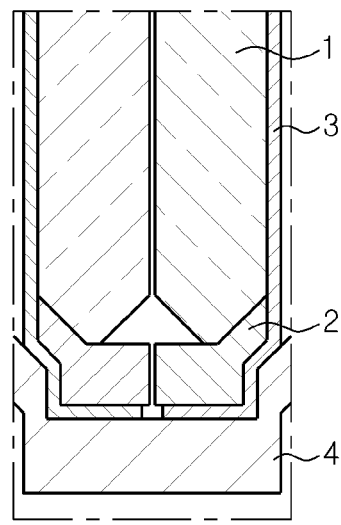
FIG. 1 is a diagram showing a cooling structure applied to a conventional battery module.
Figure 2:
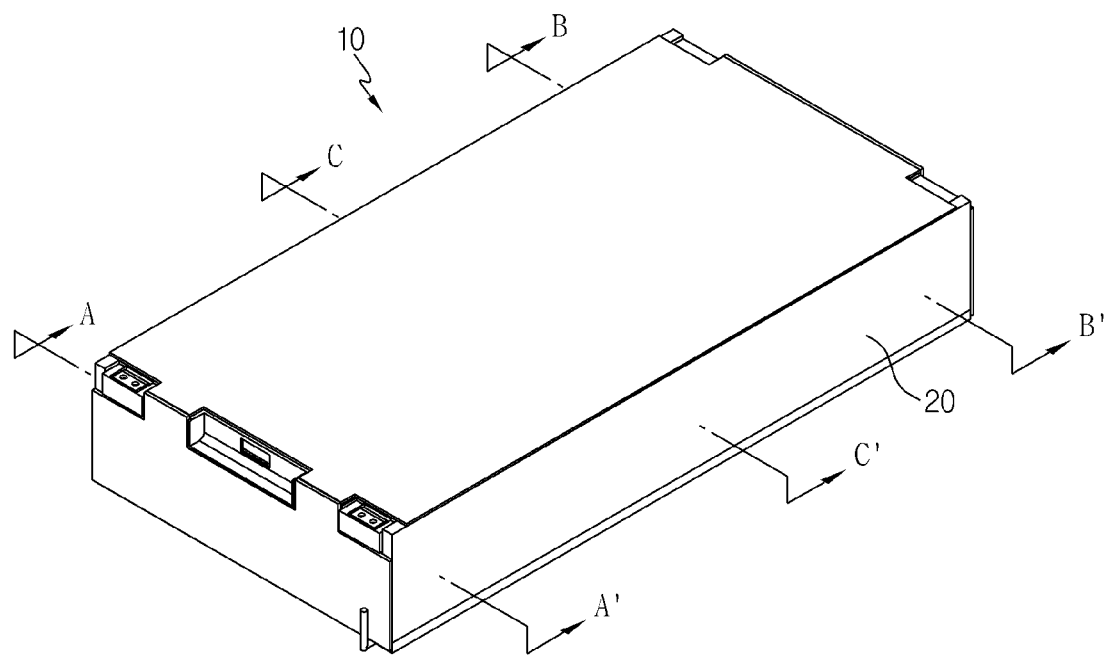
FIG. 2 is a perspective view showing an appearance of a battery module according to an embodiment of the present disclosure.
Figure 3:
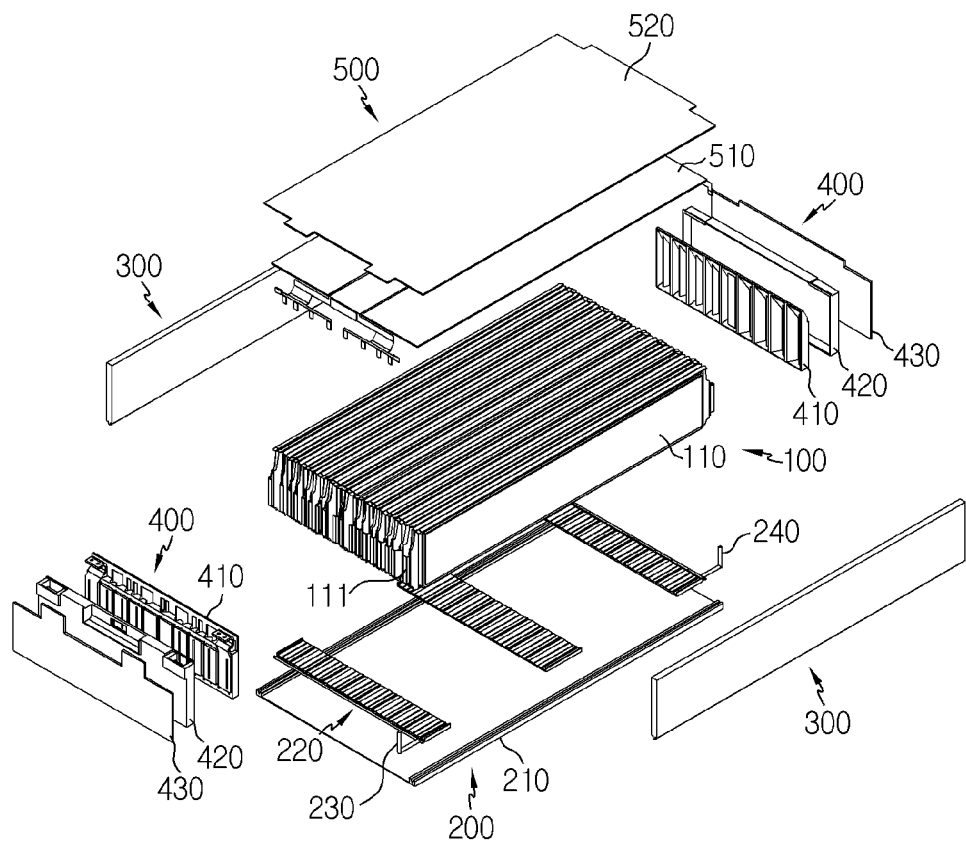
FIG. 3 is an exploded perspective view showing the battery module according to an embodiment of the present disclosure.

FIG. 2 is a perspective view showing an appearance of a battery module according to an embodiment of the present disclosure, and FIG. 3 is an exploded perspective view showing the battery module according to an embodiment of the present disclosure.

Referring to FIGS. 2 and 3, a battery module 10 according to an embodiment of the present disclosure includes a cell stack 100 and a module housing 20 for accommodating the cell stack 100. Also, the module housing 20 includes a lower housing 200, a pair of side housings 300, a pair of front and rear housings 400, and an upper housing 500.

The cell stack 100 is prepared by stacking a plurality of battery cells 110. The battery cell 110 used herein is not particularly limited as long as it is a secondary battery capable of charging and discharging. For example, the battery cell 110 may be a pouch-type battery cell.

Each of the battery cells 110 may have a pair of electrode leads 111 extending to one side and the other side. The electrode leads 111 include a positive electrode lead and a negative electrode lead. As explained later, the stacked battery cells 110 may be firmly fixed and sealed by an adhesive or the like so that a cooling medium such as an insulating oil, which is in contact with a lower portion of the cell stack 100, is not able to penetrate through the space between the battery cells 110 of the cell stack 100.

In addition, the electrode leads 111 may be arranged or connected such that the battery cells 110 of the cell stack 100 are connected in series, in parallel, or both in series and in parallel.

The lower housing 200 includes a base plate 210 for entirely covering a lower surface of the cell stack 100, a spacer 220 for partially covering the lower surface of the cell stack 100, a supply tube 230 connected to the spacer 220 to supply a cooling medium such as an insulating oil for cooling the battery module 10, and a discharge tube 240 connected to the spacer 220 to discharge the cooling medium to the outside.

The spacer 220 is interposed between the cell stack 100 and the base plate 210 and forms an empty space between the cell stack 100 and the base plate 210 by partially covering the lower surface of the cell stack 100. That is, the empty space corresponds to a closed space surrounded by the cell stack 100, the spacer 220, and the base plate 210.

The supply tube 230 is connected to the spacer 220 from a front portion of the battery module 10 to supply a cooling medium into the spacer 220. The cooling medium supplied into the spacer 220 is supplied to the empty space between the cell stack 100 and the base plate 210 through a channel formed inside the spacer 220.

The discharge tube 240 is connected to the spacer 220 from a rear portion of the battery module 10 to discharge the cooling medium flowing through the empty space and the inside of the spacer 220 to the outside.

The pair of side housings 300 respectively cover both sides of the cell stack 100 and face wide surfaces of the battery cells 110 disposed on outermost sides among the battery cells 110 of the cell stack 100. The pair of side housings 300 may press the cell stack 100 at both sides thereof to prevent an empty space from being created between the battery cells 110 of the cell stack 100.

The pair of front and rear housings 400 may include a bus bar frame 410, an insulation cover 420, and front and rear plates 430, respectively.

The bus bar frame 410 is coupled to the cell stack 100 from the front or rear portion of the cell stack 100. The electrode leads 111 are inserted into the bus bar frame 410 to facilitate the bending of the electrode lead 111 for electrical connection between the battery cells 110. That is, the electrode leads 111 are inserted through insert slits formed at the bus bar frame 410 and then bent so that the adjacent electrode leads 111 are coupled to each other by welding or the like.

The insulation cover 420 is a component provided to prevent the electrode leads 111, which are coupled to each other by being inserted into the bus bar frame 410 and bent (but should not be in contact with each other), from contacting each other. The insulation cover 420 is coupled onto the bus bar frame 410 to prevent a short caused by an external factor.

The front and rear plates 430 are components coupled onto the insulation cover 420 and serve to protect internal components such as the cell stack 100, the bus bar frame 410, and the insulation cover 420.

The upper housing 500 may include a sensor assembly 510 disposed at an upper portion of the cell stack 100 and electrically connected to the electrode leads 111 inserted and bent through the bus bar frame 410, and a top plate 520 coupled to an upper portion of the sensor assembly 510 to form an outermost layer of the upper housing 500.

Next, the specific cooling structure of the battery module according to an embodiment of the present disclosure will be described with reference to FIGS. 4 to 8 along with FIGS. 2 and 3.

Figure 4:
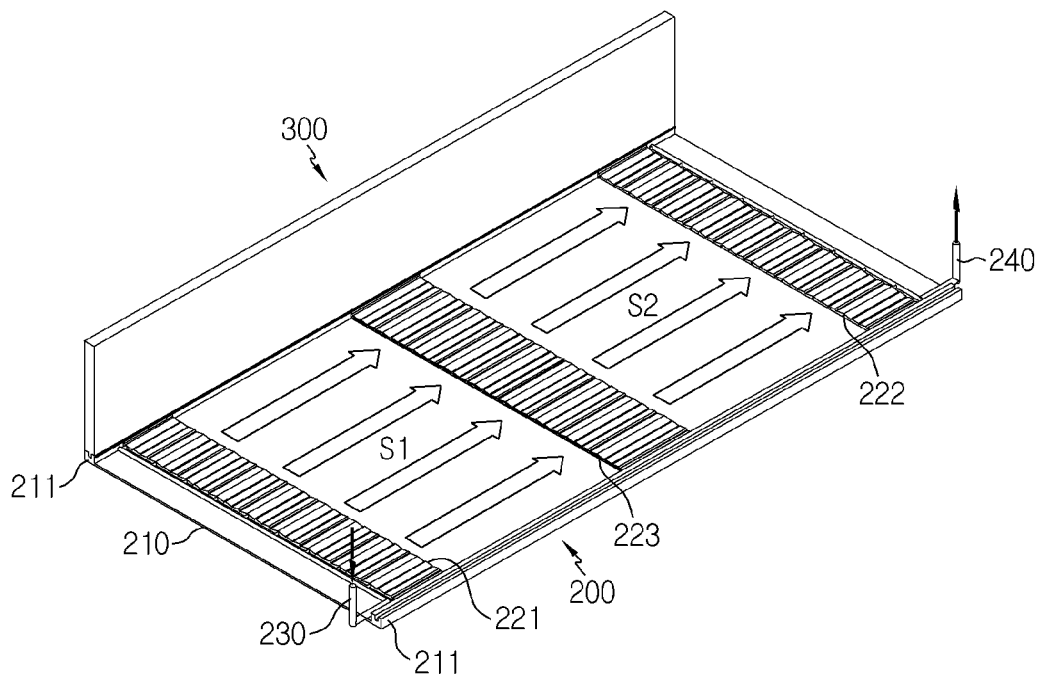
FIG. 4 is a diagram showing that a cooling medium flows on a base plate of the battery module according to an embodiment of the present disclosure.
Figure 5:
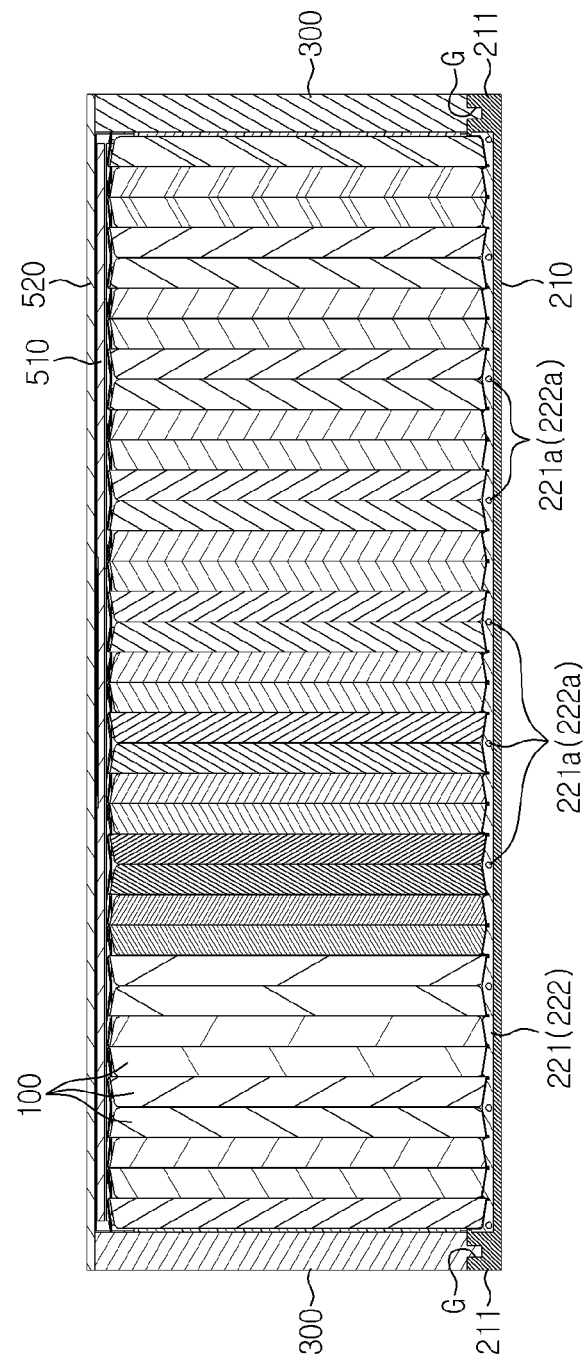
FIG. 5 is a cross-sectional view, taken along the lines A-A' and B-B' of FIG. 2.
Figure 6:
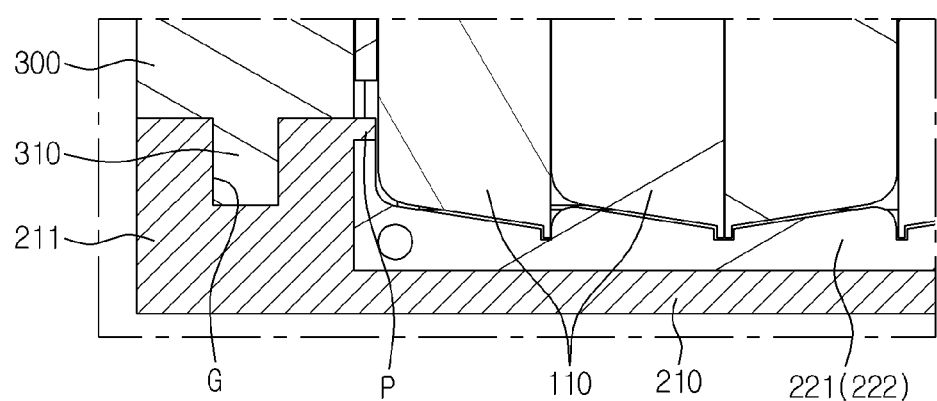
FIG. 6 is an enlarged view showing one side of FIG. 5.
Figure 7:
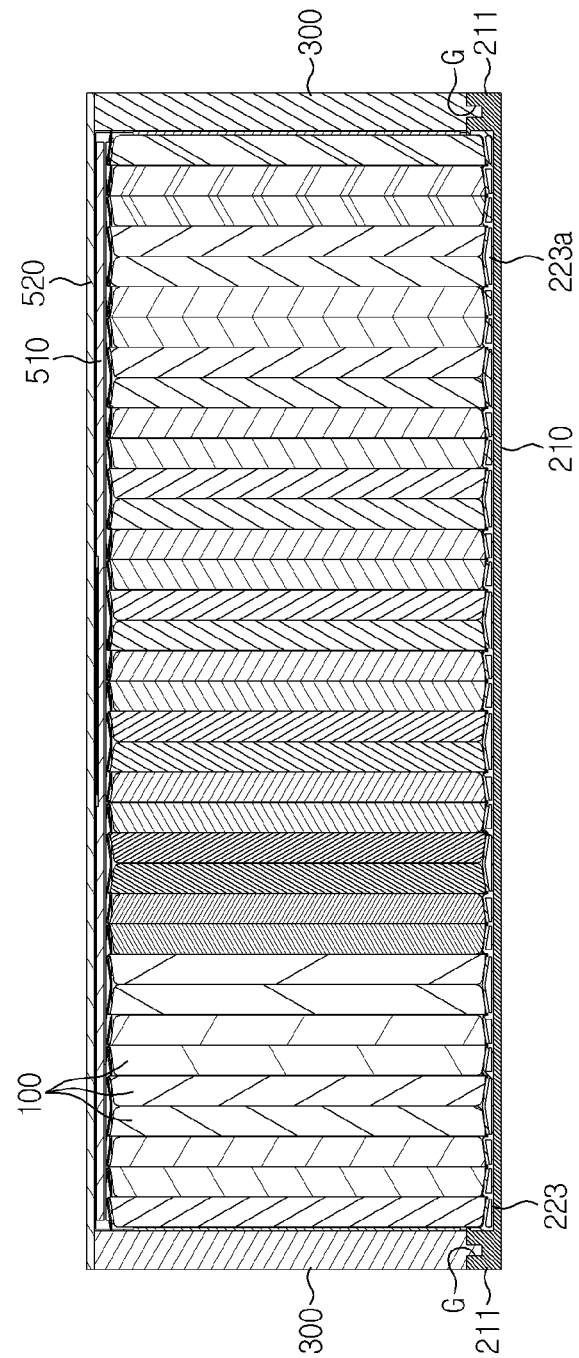
FIG. 7 is a cross-sectional view, taken along the lines C-C' of FIG. 2.
Figure 8:
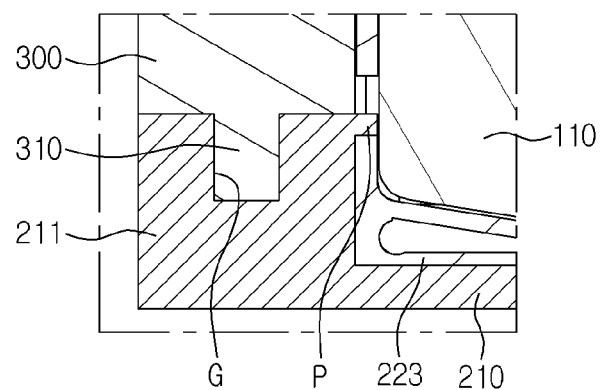
FIG. 8 is an enlarged view showing one side of FIG. 7.

FIG. 4 is a diagram showing that a cooling medium flows on a base plate of the battery module according to an embodiment of the present disclosure; FIG. 5 is a cross-sectional view, taken along the lines A-A' and B-B' of FIG. 2; and FIG. 6 is an enlarged view showing one side of FIG. 5. Also, FIG. 7 is a cross-sectional view, taken along the lines C-C' of FIG. 2, and FIG. 8 is an enlarged view showing one side of FIG. 7.

Referring to FIGS. 4 to 8 along with FIGS. 2 and 3, a coupling unit 211 having a coupling groove G formed at a predetermined depth in a downward direction from the top is provided at both sides of the base plate 210. Meanwhile, a coupling protrusion 310 protruding downward is provided at a lower end of the side housing 300, and the coupling protrusion 310 is inserted and fixed into the coupling groove G, thereby fixing the side housing 300 to the base plate 210.

The coupling unit 211 has a protrusion P protruding toward the inside of the battery module. The protrusion P extends to contact the battery cell 110 disposed at the outermost side to prevent a gap from being created between the base plate 210 and the cell stack 100 that could cause leakage of the cooling medium.

Also, an adhesive is interposed between the cell stack 100 and the spacer 220 so that the cooling medium, such as an insulating oil, does not leak between the cell stack 100 and the spacer 220. The adhesive not only couples and fixes the cell stack 100 and the spacer 220 to each other but also functions as a gasket.

Meanwhile, the spacer 220 may be formed with a plurality of unit spacers spaced apart from each other. For example, the spacer 220 may include a first spacer 221 provided at one end of the base plate 210 in a longitudinal direction, a second spacer 222 provided at the other end of the base plate 210 in the longitudinal direction, and a third spacer 223 spaced apart from the first spacer 221 and the second spacer 222 and provided between the first spacer 221 and the second spacer 222.

However, even though three unit spacers are depicted in the figures, the number of unit spacers is not limited thereto, and more unit spacers may be provided. That is, one or more unit spacers spaced apart from each other may be provided between the first spacer 221 and the second spacer 222. However, hereinafter, for convenience of explanation, it will be described that three unit spacers are provided.

The supply tube 230 may be connected to the first spacer 221 from the front portion of the battery module 10 to supply the cooling medium to the battery module 10. Likewise, the discharge tube 240 may be connected to the second spacer 222 from the rear portion of the battery module 10 to cool the battery module 10 and discharge the heated cooling medium to the outside.

That is, the supply tube 230 is connected to a plurality of first spacer channels 221a provided through the inside of the first spacer 221 to supply the cooling medium. That is, the supply tube 230 extends along the extension direction of the first spacer 221 disposed across the width of the base plate 210, namely the longitudinal direction of the first spacer 221, and is individually connected to the plurality of first spacer channels 221a to supply the cooling medium to all of the first spacer channels 221a.

Meanwhile, the discharge tube 240 is connected to a plurality of second spacer channels 222a provided through the inside of the second spacer 222, similar to the supply tube 230 described above, to discharge the cooling medium. That is, the discharge tube 240 extends along the extension direction of the second spacer 222 disposed across the width of the base plate 210, namely the longitudinal direction of the second spacer 222, and is individually connected to the plurality of second spacer channels 222a to discharge the introduced cooling medium through all of the second spacer channels 222a.

Meanwhile, the third spacer 223 may include a plurality of third spacer channels 223a formed through the inside of the third spacer 223 to allow the cooling medium flowing into the inner space S1 of the battery module 10 through the first spacer 221 to pass toward the second spacer 222.

The third spacer channels 223a are exposed out of the third spacer 223 so that the space S1 between the first spacer 221 and the third spacer 223 and the space S2 between the third spacer 223 and the second spacer 222 are in communication with the inner space of the third spacer 223.

That is, the cooling medium supplied to the battery module 10 through the supply tube 230 is discharged out of the battery module 10 by moving through the supply tube 230, the first spacer 221, the space S1, the third spacer 223, the space S2, the second spacer 222, and the discharge tube 240 in order.

Next, a battery module according to another embodiment of the present disclosure will be described with reference to FIG. 9.

Figure 9:
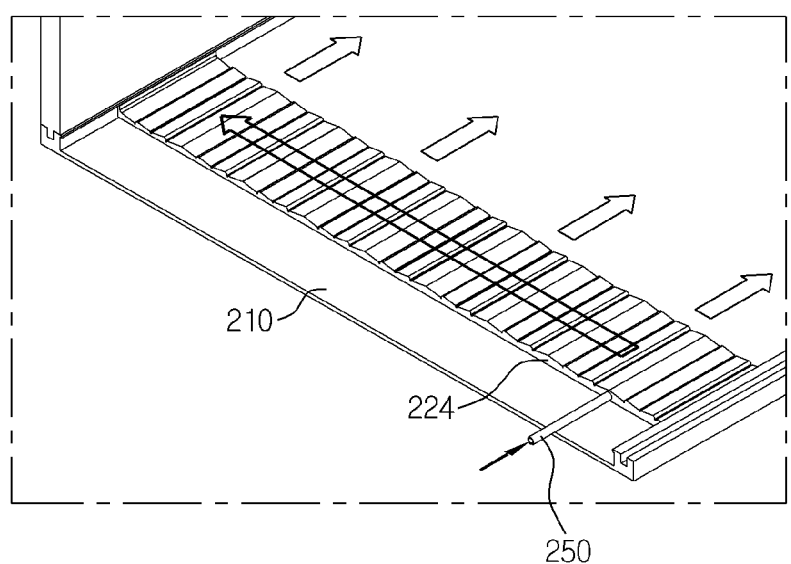
FIG. 9 is a diagram showing a supply tube and a spacer, implemented in a different way from the supply tube and the spacer depicted in FIG. 4.

FIG. 9 is a diagram showing a supply tube and a spacer, implemented in a different way from the supply tube and the spacer depicted in FIG. 4.

The battery module according to this embodiment of the present disclosure is substantially identical to the battery module of the former embodiment, even though there is a slight difference in the connection structure between the supply tube 250 and the first spacer 224 and the specific configuration of the first spacer 224. Thus, in describing the battery module according to this embodiment of the present disclosure, features different from the former embodiment will be described in detail, and features already described in the former embodiment will not described again.

Referring to FIG. 9, in the battery module according to this embodiment of the present disclosure, the supply tube 250 and the first spacer 224 are connected at one spot, rather than plural spots, and a channel (not shown) of the first spacer 224 connected to the supply tube 250 communicates with the plurality of channels for discharging the cooling medium.

As described above, in the battery module 10 according to the present disclosure, the spacer 220 is partially applied between the cell stack 100 and the base plate 210, and the cooling medium is supplied into the empty spaces S1, S2 formed between the cell stack 100 and the base plate 210 so that the cell stack 100 may be brought into direct contact with the cooling medium, thereby maximizing the cooling efficiency.

Also, the battery module 10 according to the present disclosure functions to provide improved sealing properties to enhance the reliability of the product by eliminating leakage of the cooling medium, which may occur when a liquid cooling medium such as a cooling water and an insulating oil is in direct contact with the battery cell 110.

In addition, a battery pack according to an embodiment of the present disclosure, which is implemented by electrically connecting plurality of the battery modules described above, and a vehicle having the battery pack may also exhibit excellent performance since they have the above advantages of the battery module.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery module, comprising:
a cell stack defined by a stack of a plurality of battery cells, the plurality of battery cells in the cell stack collectively defining a lower surface of the cell stack; and
a module housing configured to accommodate the cell stack and having a lower housing, a pair of side housings, a pair of front and rear housings, and an upper housing for respectively covering a lower portion, both side portions, front and rear portions, and an upper portion of the cell stack,
wherein the lower housing includes:
a base plate configured to extend alongside the lower surface of the cell stack;
a spacer interposed between the cell stack and the base plate and configured to partially cover the lower surface of the cell stack so that an empty space is defined between the cell stack and the base plate, an upper boundary of the empty space being defined by the lower surface of the cell stack;
a supply tube connected to the spacer to supply a cooling medium to the empty space through the inside of the spacer so that the cooling medium comes into direct contact with the plurality of battery cells via the lower surface of the cell stack; and
a discharge tube connected to the spacer to discharge the cooling medium from the empty space and the spacer.

2. The battery module according to claim 1,
wherein an adhesive is interposed between the lower surface of the cell stack and the spacer to inhibit leakage of the cooling medium between the cell stack and the spacer.

3. The battery module according to claim 2,
wherein opposing sides of the base plate include a respective coupling unit, each coupling unit having a coupling groove, wherein each side housing of the pair of side housings includes a coupling protrusion at a lower end thereof, and wherein the coupling protrusions are configured to be inserted and fixed into the respective coupling grooves to fix the pair of side housings to the base plate.

4. The battery module according to claim 3,
wherein each of the coupling units has a protrusion protruding toward an inner side of the battery module, each protrusion extending to contact a battery cell located at an outermost side of the cell stack to prevent the cooling medium from leaking between the base plate and the cell stack.

5. The battery module according to claim 1, wherein the spacer includes:
a first spacer provided at one end of the base plate in a longitudinal direction of the base plate; and
a second spacer provided at an opposing end of the base plate in the longitudinal direction.

6. The battery module according to claim 5, wherein the spacer further includes a third spacer located between the first spacer and the second spacer, the third spacer being spaced apart from both the first spacer and the second spacer so as to define a first open space between the first spacer and the third spacer and so as to define a second open space between the second spacer and the third spacer.

7. The battery module according to claim 6,
wherein the supply tube is connected to a first spacer channel formed through the inside of the first spacer, and
wherein the discharge tube is connected to a second spacer channel formed through the inside of the second spacer.

8. The battery module according to claim 7,
wherein the third spacer has a third spacer channel formed through the inside thereof so that the cooling medium supplied through the first spacer flows from the first open space to the second open space via the third spacer channel.

9. A battery pack including a plurality of battery modules defined in claim 1, the plurality of battery modules being connected together.

10. A vehicle, comprising the battery pack defined in claim 9.

11. A battery module, comprising:
a cell stack defined by a stack of a plurality of battery cells; and
a module housing configured to accommodate the cell stack and having a lower housing, a pair of side housings, a pair of front and rear housings, and an upper housing for respectively covering a lower portion, both side portions, front and rear portions, and an upper portion of the cell stack,
wherein the lower housing includes:
a base plate configured to cover a lower surface of the cell stack;
a spacer interposed between the cell stack and the base plate and configured to partially cover the lower surface of the cell stack so that an empty space is defined between the cell stack and the base plate;
a supply tube connected to the spacer to supply a cooling medium to the empty space through the inside of the spacer;
a discharge tube connected to the spacer to discharge the cooling medium from the empty space and the spacer; and
an adhesive interposed between the cell stack and the spacer to inhibit leakage of the cooling medium between the cell stack and the spacer,
wherein opposing sides of the base plate include a respective coupling unit, each coupling unit having a coupling groove,
wherein each side housing of the pair of side housings includes a coupling protrusion at a lower end thereof, the coupling protrusions being configured to be inserted and fixed into the respective coupling grooves to fix the pair of side housings to the base plate, and
wherein each of the coupling units has a protrusion protruding toward an inner side of the battery module, each protrusion extending to contact a battery cell located at an outermost side of the cell stack to prevent the cooling medium from leaking between the base plate and the cell stack.

* * * * *